March 3, 1953  F. D. BRADDON ET AL  2,630,016
INCLINED GYROSCOPIC HORIZON

Filed Aug. 17, 1950  3 Sheets-Sheet 1

INVENTORS
FREDERICK D. BRADDON
WALTER WRIGLEY
BY
Herbert H. Thompson
THEIR ATTORNEY March 3, 1953  F. D. BRADDON ET AL  2,630,016
INCLINED GYROSCOPIC HORIZON Filed Aug. 17, 1950  3 Sheets-Sheet 2

INVENTORS
FREDERICK D. BRADDON
WALTER WRIGLEY
BY Herbert P. Thompson
THEIR ATTORNEY

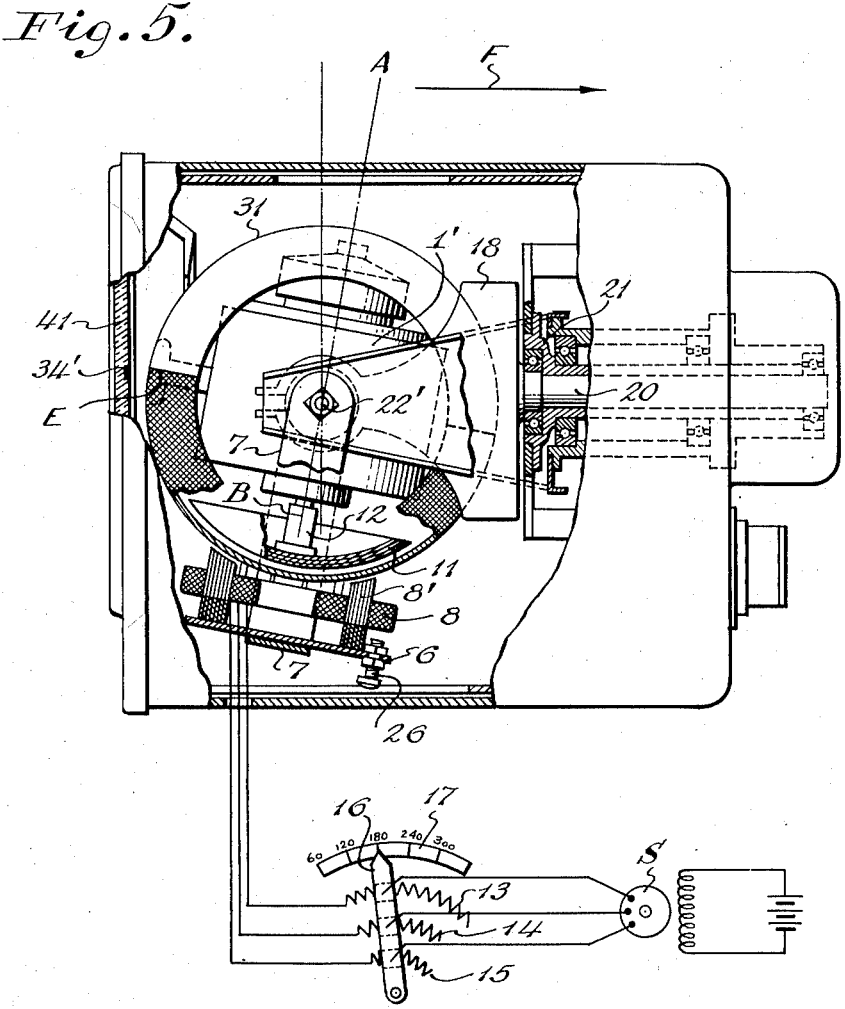

Patented Mar. 3, 1953

2,630,016

UNITED STATES PATENT OFFICE 2,630,016

INCLINED GYROSCOPIC HORIZON

Frederick D. Braddon, Babylon, N. Y., and
Walter Wrigley, Wollaston, Mass.

Application August 17, 1950, Serial No. 179,978

12 Claims. (Cl. 74—5.46)

This invention relates to gyroscopic artificial horizons, sometimes known as gyro-verticals, which are employed not only as visual indicators but also as base lines from which to control the lateral and longitudinal stability of aircraft and of sighting and radar equipment on ships, aircraft or other dirigible craft. Such gyroscopes are usually mounted in substantially neutral equilibrium, or made slightly pendulous, and are maintained in their normal positon primarily by gravitationally controlled erecting devices, such as pendulums or liquid level devices which govern a source of power applying a torque substantially normal to the direction of tilt. Such gravitationally responsive erecting devices, however, cause temporary errors in the position of the gyro-vertical which persist for some time after the aircraft is subjected to acceleration forces, the most troublesome and most recurrent of which are those due to turning of the craft.

As a turn progresses, due to the shifting viewpoint of the pilot with respect to the gyroscope's position in space, the resultant error appears on the instrument as a gradually increasing error in pitch. The rate of this precession is greater than the conventional erecting system about the pitch axis can correct for during the turn, and hence builds up during the turn (up to 180°) and persists after a turn until eliminated by the pitch erecting device. The aforementioned resulting error in pitch due to turns usually reaches a maximum in the vicinity of a 180° turn, and the amount of the error is a direct function of the strength of the erection force.

In the prior application of one of the present applicants, Frederick D. Braddon, now Patent No. 2,409,659, for Gyro-Verticals, dated October 22, 1946, there is shown a method of overcoming the aforesaid error by inclining the gyro forwardly on the craft a few degrees. This method is shown as applied, in the aforesaid application, primarily to a gyroscope in which the erecting force during turns is substantially constant, that is, the form shown in Figs. 1 and 2 thereof. A similar method may also be applied where the erection force is of a different character, i. e., one in which the force is (within limits) generally proportional to a linear function of the relative tilt of a free pendulum and the gyroscope during turns. It is to this latter form of the prior invention that this application is mainly directed.

We have found that this latter type of gyroscope obeys a different law than the former type during turns, namely, that the rate of precession during a turn is substantially independent of the rate of turn, as such, but on the other hand, varies with air speed. Therefore, this form of the invention has the advantage that it is correct for different rates of turn as long as the air speed remains approximately that for which the device is designed.

A further improvement over the aforesaid application consists in giving the gyroscope a slight lateral inclination in addition to its fore and aft inclination in cases where the gyro is made slightly pendulous, which is frequently done for several reasons. The present invention has especial utility in such case, since the same law of proper performance (correct rate of precession for a selected air speed) will apply about both axes, and true compensation will be effected.

Referring to the drawings showing several forms our invention may assume,

Fig. 5 is a side elevation, partly in section, showing a further modification in which selected features of the other two forms of the invention are combined.

Figure 1:
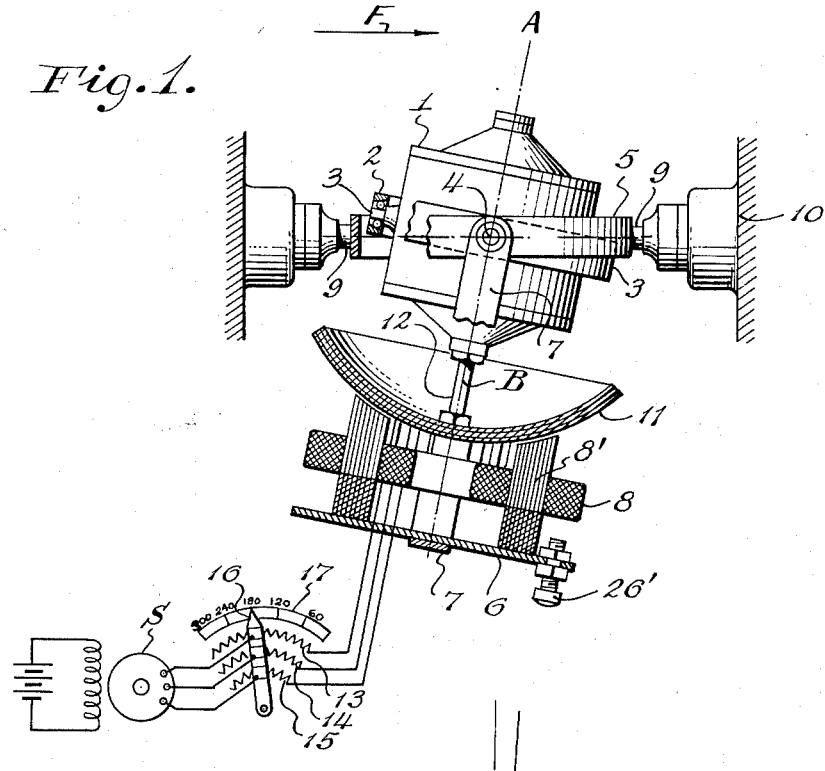
Fig. 1 is a side elevation, partly in section, of our inclined gyro with an eddy current electromagnetic erection device for applying an erecting torque substantially proportional to relative tilt of the pendulum and gyro from normal.

As stated above in the present invention the magnitude of the gyro erection force is proportional to the angle between the gyro and the controlling pendulum (i. e. the relative tilt), and the amount of inclination required to eliminate turn error is independent of the rate of turn of the vehicle and depends only on the vehicle's speed. That this is true may be realized from the following analysis. The aforesaid relative tilt angle is the angle between the true vertical (held by the gyroscope) and the temporary dynamic or virtual vertical which is assumed by the pendulum, and such angle is very closely proportional to the product of the speed of the vehicle $(v)$ and its rate of turn $(\omega)$. This rate-of-turn factor $(\omega)$ cancels the inverse rate-of-turn factor $\left(\dfrac{1}{\omega}\right)$ present in the prior form of the invention, leaving the speed effect as the only variable.

To state the above mathematically, according to the prior invention $$X_0 = \frac{M}{H\omega} \quad (1)$$

where $X_0$ = gyro inclination required
$M$ = erection torque (a constant)
$H$ = gyro momentum (a constant) and
$\omega$ = rate of turn of the vehicle selected.

If, however, an erection torque proportional to the relative tilt (Y) of the gyro and pendulum is employed, the torque M becomes a variable and its value is given by the equation $$M = M'Y \quad (2)$$

where Y is the variable dynamic vertical angle and $M'$ represents the proper torque when Y is unity or one radian.

Y (the dynamic vertical angle) is also very closely given for angles up to about 30° (in which the tangent of Y may be taken as equal to the angle Y) by the equation $$Y = \frac{v\omega}{g} \quad (3)$$

where $v$ = vehicle speed
$g$ = gravity since the lateral acceleration in a turn is equal to the product of the linear velocity and angular rate of turn.

Solving for Y in Equation 2 and equating (2) and (3) and solving for M, we have $$M = \frac{v\omega M'}{g} \quad (4)$$

Then solving Equation 1 for M and equating (1) and (4) and solving for $X_0$, we have $$X_0 = \frac{M'v}{Hg} \quad (5)$$

showing that the correct angle of tilt in this case is independent of the rate of turn ($\omega$), but varies with actual speed ($v$) and with the torque exerted per radian of tilt or other angular unit by the erection device.

A study of Equation 5 will further show that in order to keep the forward tilt angle $X_0$ a constant, when air speed $v$ is varied, the erection torque gradient $M'$ must be varied inversely, since both $v$ and $M'$ lie in the numerator and H and $g$ are constants. Equation 5 also shows that the tilt angle $X_0$ should be varied directly with air speed $v$ if $M'$, the erection torque, bears a fixed proportional relation to tilt. On the other hand, Equation 1 shows that in case of a gyro having a substantially constant erection torque, M, regardless of tilt, $X_0$ should be varied inversely as $\omega$, the rate of turn of the craft.

The foregoing demonstration shows that our invention, although useful for airplane cruising speeds where the virtual vertical would not exceed 30°, has especial utility for ships and slower speed vehicles, where the linear speed is less than that of airplanes, although the angular rate in turning may be as great or greater than encountered in aircraft.

Figure 4:
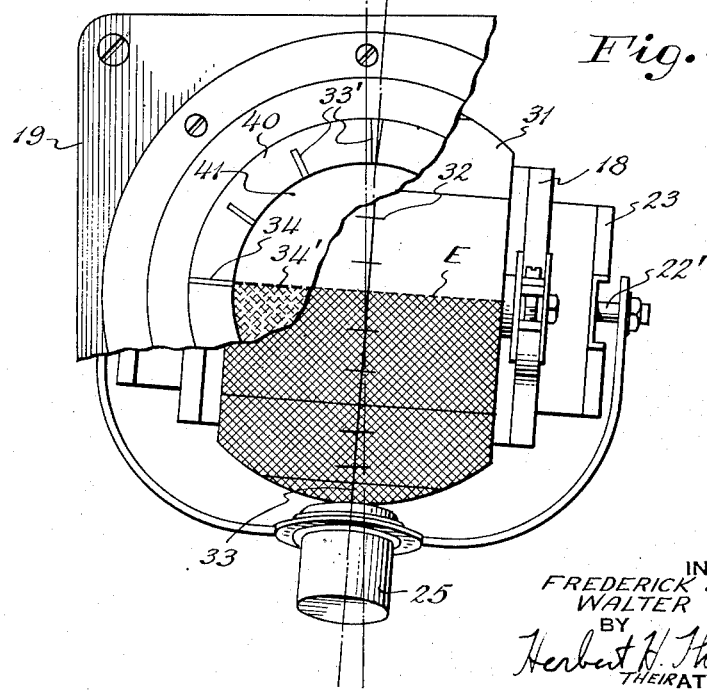
Fig. 4 is a front elevation of this form of the invention, with the outer casing broken away.
Figure 2:
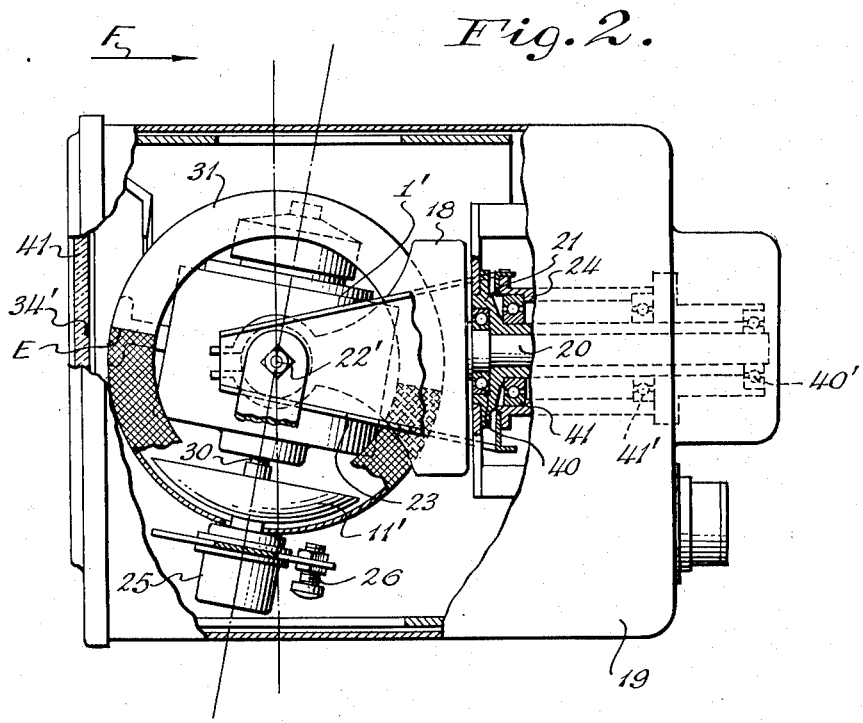
Fig. 2 is a side elevation, partly in section, of a modified form of the invention using a simpler form of eddy current erector and in which the gyro is inclined both forwardly and laterally.
Figure 3:
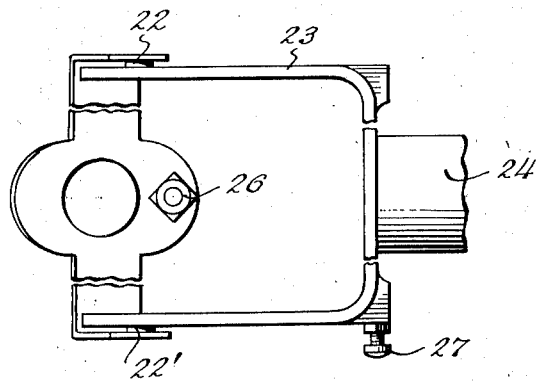
Fig. 3 is a detailed plan view of the gimbal support for a pendulum erector.

Referring first to the form of the invention shown in Figs. 2, 3 and 4, the gyro rotor case 1' is shown as normally forwardly inclined on normally horizontal athwartship trunnions in a U-shaped gimbal ring 18, which in turn is pivoted within the outer casing 19 by means of a long trunnion 20 journaled in spaced anti-friction bearings 40, 40' within a sleeve 21 fixed to the casing. A pendulously mounted controller or erection device is likewise universally pivoted about axes coincidental with the axes of support of the casing 1', the pendulum being hung on transverse pivots 22, 22' within a second U-shaped gimbal ring 23 which is outside of the gimbal ring 18 and is journaled at the rear of the casing on the outside of the aforesaid sleeve 21 by means of an outer sleeve 24 on spaced anti-friction bearings 41, 41'. The pendulous controller is in the form of a magnet 25 which may be either permanent or otherwise and the casing 1' is normally maintained forwardly inclined by unsymmetrically weighting the pendulum so that the magnet will hang forwardly by an amount sufficient to give the desired angle of inclination, which is usually on the order of about 2½° which angle is exaggerated in the drawings. This is secured by means of an adjustable weight 26.

An erection force, substantially right angles to the relative tilt of the casing 1' with respect to the pendulous controller, is obtained by the interaction between the magnetic field created by the magnet 25 and a spinning magnetic cup 11' preferably secured or attached to an extension 30 of the rotor shaft. The eddy current drag created by rotation of the cup in the magnetic field causes a small couple to be exerted on the gyroscope substantially at right angles to the tilt. This couple is entirely absorbed by the gimbal supports except when the magnet and spin axis of the gyro get out of line, in which case it becomes effective to slowly bring the gyroscope into alignment with the magnet, being proportional to relative tilt.

We also may cause the gyro to be inclined laterally to compensate for turn errors caused by its being made slightly pendulous (see Fig. 4). This may be secured by an adjustable weight 27 on gimbal ring 23 of pendulous magnet 25, and leaving the gyro symmetrically pendulous about both gimbal axes. This has the advantage that in case the gyroscope goes through gimbal lock and is reversed to bring its rear side forward, as is possible in the type of attitude gyroscope shown in Figs. 2 and 3, the inclination will still remain in the proper direction, which is likewise true of forward inclination due to the weight 26 on the magnet support. In this case, the relative rotation of the magnetic flux and the cup 11' is secured by spinning the cup, preferably by mounting it on extension 30 of the rotor shaft.

Our invention is especially useful in laterally inclined, slightly pendulous gyroscopes because the law of the proper angle of lateral inclination for such gyroscopes is the same as the law of applicants' forward inclination to correct for the error due to the erector. In other words, it may be shown that the mathematical demonstration given hereinbefore with respect to applicants' erector applies equally to a pendulous gyro inclined laterally, since in both the acceleration torque during turns is proportional to the lateral acceleration force. In practice, the pendulousness, and hence the lateral inclination, is quite small (on the order of 2° or less), while with our proportional erector the forward inclination to compensate for speeds encountered in aircraft is somewhat larger, although for ships' speeds it would remain quite small.

The horizon indicator is shown as of the universal attitude type as shown in the prior application of O. E. Esval, W. Wrigley and R. Haskins, Jr., Serial No. 636,384 for Attitude Gyro, filed December 21, 1945, in the form of a truncated sphere or spherical shell 31 surrounding the rotor casing 1', the shell being graduated with parallel latitude lines 32 to furnish an indication of pitch, and having a central meridian line 33 to give an indication of bank when read on indices or scale 33' on the bezel 40 surrounding the front window 41. Preferably also, the lower half of the sphere is shaded differently from the upper half, and the equatorial line E is read against horizontal indices 34 and the heavy mark 34' on the front bezel 40 of the window 41. The sphere graduations with respect to their indices on the front are so arranged as to indicate the horizontal position when the ship is horizontal and the gyro is inclined at the predetermined inclination in both planes. This may be done by displacing the equatorial line downwardly through an angle equal to the angle of inclination, and also inclining it laterally and oppositely to the angle of lateral inclination, but it may also be accomplished for small inclinations by alternatively displacing in the opposite manner the indices on which the indications read. The latter method is shown in Figs. 2 and 4 and the former in the aforesaid Braddon application. The method used in Figs. 2 and 4 has the advantage in the attitude or universal-type gyroscope that the readings remain correct regardless of gyro reversal during gimbal lock.

In our invention, therefore, the gyroscope will always remain inclined at the same inclination to the right or left and forwardly, regardless of turns of the craft, as long as a predetermined air speed is maintained, and even though the air speed may be departed from to some extent, the error in the gyro will be largely not apparent to the aviator since the gyro will be precessed at the nearly proper rate as the craft turns, to substantially maintain its predetermined inclination with respect to the craft. Exact compensation may be obtained by adjusting the erection rate in accordance with air speed, but for ordinary operation, the device may be set for the cruising speed of the craft and satisfactory performance secured for all operating conditions usually encountered in flight.

The form of the invention shown in Fig. 1 does not differ greatly from the form shown in Figs. 2–4. In this figure, the horizon indicator proper and outer casing have been omitted but it will be understood that both may assume the form shown in Figs. 2–4 or the older form shown in the aforesaid Braddon application.

The gyro is shown as comprising a rotor casing 1 universally mounted in substantially neutral equilibrium, by being pivoted within gimbal ring 2 on trunnion axis 3—3, the gimbal in turn being pivoted on a lateral axis 4 in some support, in this case, a second gimbal ring 5, which also serves as a pivotal support for the pendulous controller 6, which is shown as pivoted from the gimbal 5 on said axis 4 by means of a bail 7 which extends below and supports the inductor windings 8 on pole pieces 8'. Gimbal ring 5, in turn, is pivoted on fore and aft axis 9—9 in the outer support or casing 10. The rotor proper (not shown) is journaled within said casing on an axis A—B which is forwardly inclined on the craft (as indicated by the arrow F) at a small angle which is shown exaggerated in Fig. 1 and which is, of course, smaller for ships than for aircraft on account of the lesser speed.

Fixed to and below the casing is shown a metallic cup 11 made of conducting metal which corresponds in function to the cup 11' of Figs. 2–4. Cup 11, however, need not be revolved since the moving magnetic field in this instance is created by the three-phase inductor 8, 8' when supplied with three-phase current from source S, the inductor constituting the pendulous controller. Therefore, the disc 11 may be fixed to post 12 extending below the gyro casing. Further explanation of this type of erector may be found in the prior patent to O. E. Esval et al., No. 2,229,645, dated January 28, 1941.

As is the case in Figs. 2–4, disc 11 is dished about the intersection of axes 3 and 4 as a center, about which center the pendulous inductor is pivoted so that uniform spacing of the disc and conductor is maintained through all ordinary angles or relative tilt, thereby maintaining the erection rate substantially proportional to such tilt. Also as in the first described form of the invention, the pendulous inductor is caused to hang at the desired angle of tilt by an unbalanced mass represented as 26' corresponding to mass 26 in Fig. 2.

There is also shown in Fig. 1 (which idea may likewise be applied to Figs. 2-4, if desired) means for varying the rate of erection so as to maintain the predetermined inclination of the instrument in direction and amount with reference to the heading of the craft, regardless of changes in the operating conditions of the craft, or in this particular instance, regardless of changes of speed. This is accomplished by varying the current supply to the windings 8 by suitable equally variable resistances 13, 14 and 15 inserted in series therewith, which may be made in the form of a rheostat having an arm 16 settable with reference to indicating dial 17, graduated preferably in miles per hour. We thereby provide a means for varying the rate of erection $M'$ of the gyro with speed $v$ to satisfy Equation 5 so that the forward inclination $X_0$ of the gyro need not be changed for different air speeds, to keep the horizon indicator level during turns. As indicated by said equation, $M'$ is varied inversely with $v$.

In Fig. 5, we have shown combined what we consider the preferred features of the other two forms of the invention, namely, in this figure, we have combined the type of attitude indicator, housing and gimbal mounting shown in Figs. 2–4 with the alternating current type of erector and with the air speed control heretofore shown in Fig. 1. The parts are correspondingly numbered, so that detailed description of this figure is not deemed necessary.

Since many changes could be made in the above construction and many apparently widely different embodiments of this invention could be made without departing from the scope thereof, it is intended that all the matter contained in the above description or shown in the accompanying drawings shall be interpreted as illustrative and not in a limiting sense.

This application is a continuation-in-part of our prior joint application Serial No. 566,568, filed December 4, 1944 for Inclined Gyroscopic Horizons.

What is claimed is:

1. In a power erected gyro-vertical for dirigible craft, a gravitationally responsive power operated erection device, including a pendulum and a torquer controlled thereby arranged to exert a torque on the gyro which increases proportionally with increasing relative tilt of the gyro and device, and so located normally with respect to the spin axis of the gyroscope as to normally maintain the spin axis forwardly inclined to the vertical at an angle bearing a predetermined relationship to the torque gradient of said torquer, such that the rate of precession of the gyroscope caused thereby due to any turn at a predetermined air speed is sufficient to cause the plane and angle of said inclination to be apparently maintained to the observer in the craft regardless of the resulting change in heading or rate of turn.

2. In a universally supported gyro-vertical for dirigible craft having a slight pendulosity, gravitationally responsive power operated means thereon for normally positioning said gyro-vertical at an inclined position having components in both the fore-and-aft and transverse planes of the craft, said means being so designed that the rate of precession caused thereby and by said pendulosity during turns is the same as the rate of turn of the craft at a predetermined rate of speed.

3. In an attitude gyroscope having like indications on both the front and back thereof so that the readings remain unaffected by reversal of the gyroscope during gimbal lock, a universally supported slightly pendulous gyroscope, an independently universally supported pendulum thereunder, a magnet carried thereby, and a cup of conducting material on the gyroscope and spun thereby above the magnet, said pendulum being unsymmetrically unbalanced so as to hang tilted toward the rear and to one side, whereby said gyroscope is erected with both a forward and lateral inclination, and both the gyroscope and its indications remain operative after gimbal lock reversal.

4. In an attitude gyroscope having like indications on both the front and back thereof so that the readings remain unaffected by reversal of the gyroscope during gimbal lock, a universally supported gyroscope, an independently universally supported pendulum thereunder, a magnet carried thereby, and a cup of conducting material on the gyroscope and spun thereby above the magnet, said pendulum being unsymmetrically unbalanced so as to hang tilted toward the rear, whereby said gyroscope is erected with a forward inclination, and both the gyroscope and its indications remain operative after gimbal lock reversal.

5. In an attitude or universal gyroscope of the type remaining unaffected by reversal of the gyroscope during gimbal lock, a casing having a window, a universally supported gyroscope in said casing, the normal position of the spin axis of said gyro being forwardly inclined, vertically spaced horizon indications on said gyroscope extending around the same and one of which constitutes an equatorial line, the plane of which is perpendicular to the spin axis, and a reference index for said equatorial line at said window which is upwardly displaced so that the readings normally show horizontal regardless of which side of the gyro is facing the window as the gyro axis remains forwardly inclined.

6. In an attitude or universal gyroscope of the type remaining unaffected by reversal of the gyroscope during gimbal lock, a casing having a window, a universally supported slightly pendulous gyroscope in said casing, the normal position of the spin axis of said gyro being forwardly and laterally inclined, vertically spaced horizon indications on said gyroscope extending around the same and one of which constitutes an equatorial line, the plane of which is perpendicular to the spin axis, and a reference index for said equatorial line at said window which is upwardly displaced and laterally inclined so that the readings normally show horizontal regardless of which side of the gyro is facing the window as the gyro axis remains forwardly inclined.

7. In an attitude or universal gyroscope of the type remaining unaffected by reversal of the gyroscope during gimbal lock, a casing having a window, a universally supported gyroscope in said casing, the normal position of the spin axis of said gyro being forwardly inclined, a generally spherical shell enclosing said gyroscope and having distinctive markings top and bottom with an equatorial line separating the same, the plane of which is perpendicular to the spin axis, and a reference index for said equatorial line at said window which is upwardly displaced so that the readings normally show horizontal regardless of which side of the gyro is facing the window as the gyro axis remains forwardly inclined.

8. An electrically erected gyro-vertical for moving craft having a case journalling a rotor on a spin axis slightly inclined to the vertical, a universal support for the case supporting the case for freedom about fore-and-aft and transverse axes, a two-part eddy current erecting means, one part being independently and pendulously mounted under said case to hang rearwardly at a small angle and the other part mounted above the first part to move with said case, said angle being such that the spin axis of the gyro is normally erected and maintained in a forwardly inclined position about the athwartship axis of the craft.

9. An eddy current erecting device for gyro-verticals having a casing and a rotor therein with the normal spin axis slightly forwardly inclined to the vertical, a universal support for said casing, a magnetic field radiator pendulously and universally supported under said casing, a cup of conducting material on said casing, means for causing relative rotation of the field produced by said radiator and said cup, said radiator being eccentrically weighted so as to hang slightly rearwardly of the vertical to maintain forward inclination of the spin axis of the gyro, and the erecting torque created by induction being such that said forward inclination is maintained in direction and amount with reference to the heading of the craft during turns.

10. In a gyro vertical, a pendulous frame for a rotor spinning about an axis, erecting means including a member defining a reference axis for the rotor, and an eccentric weight on said member for inclining the same relative to the vertical about a fore and aft axis whereby the spin axis of the rotor is normally tilted laterally to correct the instrument for turn error due to the pendulousness of the frame.

11. An automatic erecting gyro-vertical for dirigible craft having its spin axis normally forwardly inclined to the vertical about its athwartship axis at a predetermined angle, a pendulum-controlled power erection device therefor including a pendulum biased to normally hang to the rear at said angle, said device being of the type giving a rate of precession which increases proportionally to a function of the relative tilt of the gyro and pendulum during turns, the strength gradient of said erection device being so related to the gyroscopic momentum and to the angle of forward inclination that the rate of precession of the gyroscope in azimuth during turns causes the plane and angle of said inclination to be maintained with respect to the craft for a predetermined speed thereof regardless of the rate of turn.

12. In a gyro-vertical, a pendulous frame including a rotor adapted to spin about an axis, erecting means including a pendulous member defining a reference axis for the rotor, a universal mounting for said member having a fore-and-aft horizontal axis and an athwartship horizontal axis, an eccentric mass on said member for inclining the same relative to the vertical about the fore-and-aft axis whereby the spin axis of the rotor is normally tilted laterally to correct the instrument for turn error due to the pendulousness of the frame, and an eccentric mass on said member for rearwardly inclining the same relative to the vertical about the athwartship axis whereby the spin axis of the rotor is normally tilted forwardly to correct the instrument for error due to displacement of the member during turns.

FREDERICK D. BRADDON.
WALTER WRIGLEY.

REFERENCES CITED

The following references are of record in the file of this patent:

UNITED STATES PATENTS

| Number | Name | Date |
| --- | --- | --- |
| Re. 23,291 | Braddon | Nov. 7, 1950 |
| 2,409,659 | Braddon | Oct. 22, 1946 |
| 2,418,032 | Jewell | Mar. 25, 1947 |
| 2,425,300 | Braddon | Aug. 12, 1947 |
| 2,486,897 | Wendt | Nov. 1, 1949 |
| 2,501,885 | Barnes et al. | Mar. 28, 1950 |
| 2,510,968 | Fowler | June 13, 1950 |

FOREIGN PATENTS

| Number | Country | Date |
| --- | --- | --- |
| 593,963 | Great Britain | Oct. 30, 1947 |